United States Patent [19]

Story

[11] Patent Number: 4,515,437

[45] Date of Patent: May 7, 1985

[54] APPARATUS FOR FACILITATING VISUAL METER READINGS

[76] Inventor: Allan Story, P.O. Box 310, Houston, Tex. 77036

[21] Appl. No.: 493,436

[22] Filed: May 11, 1983

[51] Int. Cl.³ .............................................. G02B 5/00
[52] U.S. Cl. .................................... 350/114; 350/319
[58] Field of Search ................ 350/114, 319, 110, 115

[56] References Cited

U.S. PATENT DOCUMENTS 1,236,265  8/1917  Casson ................................. 350/319
4,215,916  8/1980  Bell et al. ............................. 350/114

FOREIGN PATENT DOCUMENTS 1181845  2/1970  United Kingdom ................ 350/114

Primary Examiner—Bruce Y. Arnold
Assistant Examiner—William Propp
Attorney, Agent, or Firm—Carwell & Helmreich

[57] ABSTRACT

Apparatus for facilitating visual reading of meters, and more particularly for reading of water meters or the like disposed beneath the ground. A center tube assembly is provided comprising a cylindrical center tube and a light guide assembly carried internal of and adjacent to the inner wall of the center tube and selectively positionable relative thereto. Disposed at the proximal and distal ends of the center tube are respective end cap assemblies each carrying a respective lens fixedly mounted therein transverse to the center line of the center tube. Each end cap further includes an outer end spacer portion which spaces the lens surfaces inward along the center line of the tube away from the outermost ridges formed by the spacers. In operation the center tube is aligned vertically over the meter face which is then viewed through the center tube upon activation of the light assembly. The spacers prevent damaging contact of the lens at either end of the center tube with the meter face when the apparatus is employed. In a further embodiment, a cleaner assembly is provided for cleaning the meter face retainedly and releasably stored internal of the center tube.

9 Claims, 2 Drawing Figures

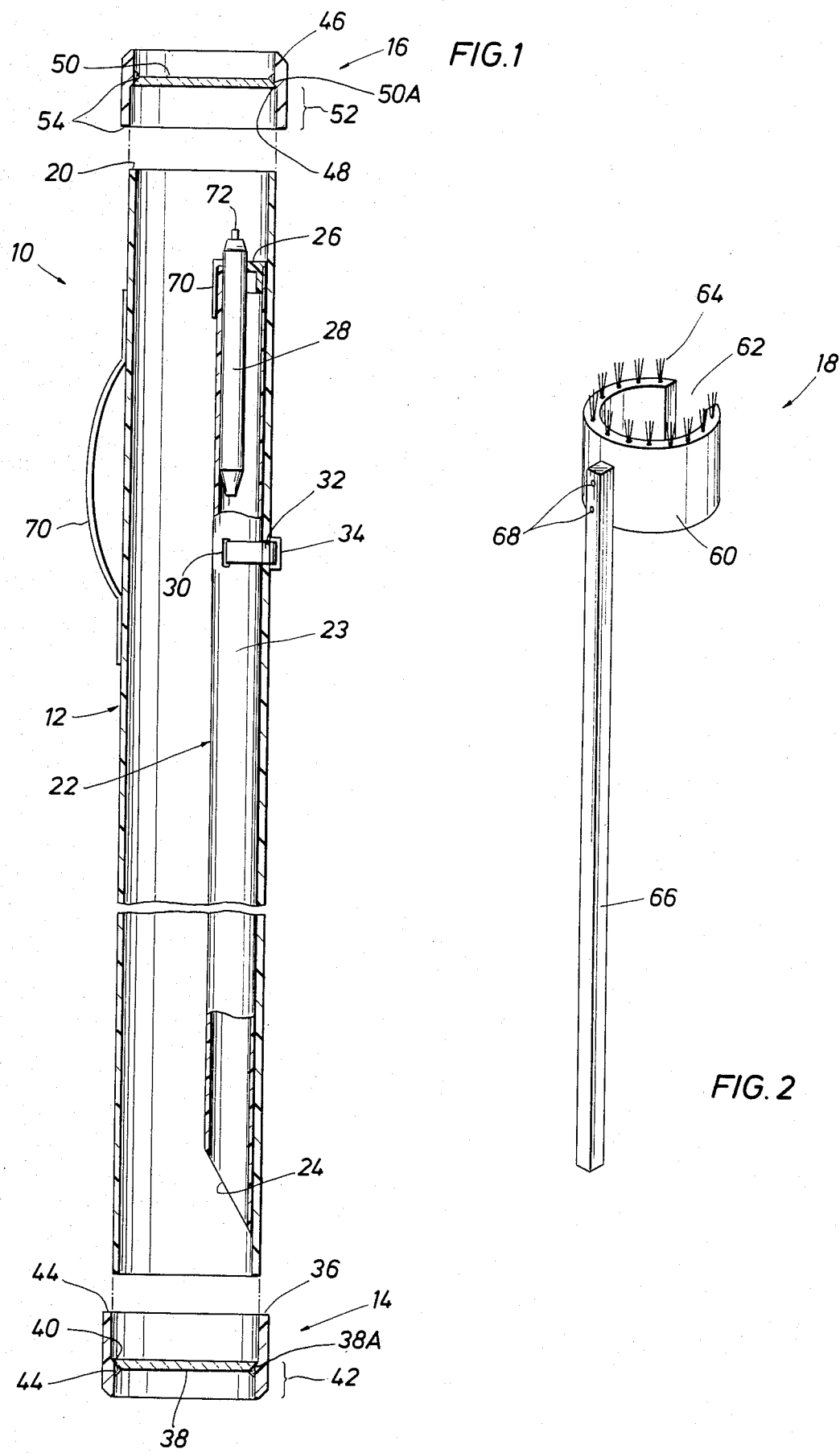

APPARATUS FOR FACILITATING VISUAL METER READINGS

BACKGROUND OF THE INVENTION

This invention relates to meter reading apparatus and, more particularly, relates to apparatus of the type adapted to facilitate the visual reading of water meters or the like disposed beneath the ground surface and particularly when submerged below water.

In a typical residential water meter installation, it is commonplace to locate the meter subterraneously in a conveniently located shallow pit, and to further provide a suitable cover which may be easily removed for periodic monitoring and recordation of the meters readings.

While it is certainly possible for the water company employee or reader to stoop or kneel to obtain a closer view of the meter dials, this becomes an impractical, extremely tiresome and physically demanding task, particularly when it is considered that such work may typically involve the reading of several hundred meters in one day.

Thus, it became highly desirable to enable a meter reader to read water meters or the like from a more erect posture. However, one problem associated with such attempts to do so was that, due to the poorly illuminated location of the meter, the positions of the various meter dials were relatively obscured resulting in inaccurate readings. The use of flashlights or other sources of artificial illumination often proved unsatisfactory due to the glare of the meter face from direct lighting. Moreover, other situations were commonly encountered wherein natural ambient light was too strong to permit such readings to be taken from a relatively upright position, again due to the meter face glare. It thus became desirable to find some method for selectively controlling the amount of light which was incident upon the meter face to adjust to the changing or varying conditions.

Yet another problem encountered was that, again, frequently due to the conventional placement of such meters, it was commonplace, upon removal of the protective covering, to find the meter face entirely covered with mud or otherwise submerged in interstitial water which had collected in the underground cavity housing the meter due to water runoffs, collection of rainfall, effluents or the like, rendering a meter reading impossible.

One attempted solution was to manually kneel down to wipe the meter face clean, thence place a canister such as a coffee can with both ends removed or a tube about the meter, and then proceed to "bail out" the area internal of the can or tube with a coffee cup or the like until the water level receeded below the meter face. Such a method was time consuming due to the fact that the can had to be wide enough to circumscribe the flipped-back protective lid to the meter face as well as the face itself, resulting in a great deal of water to be removed. It was further difficult to obtain a good seal about the meter with the can. Moreover, the necessary apparatus was extremely cumbersome and inconvenient to carry about during a day's readings along with the necessary book for recording the readings and the like.

Thus, it was highly desirable to find an apparatus for enhancing the ability to quickly read meters in a wide variety of conditions which was at the same time light, easy and convenient to carry, compact, and of a simple construction. More particularly, such an apparatus was highly desirable which would permit meter readings to be taken in erect positions in a wide variety of conditions including complete darkness or dusk, bright sunlight, and other conditions encountered at the situs of the meter such as the aforementioned submerged meter situations or those in which the face was obscured by mud or the like. These and other disadvantages of the prior art are overcome by the meter reading apparatus of the present invention.

SUMMARY OF THE INVENTION

Apparatus for facilitating visual reading of meters, and more particularly for reading of water meters or the like disposed beneath the ground. A center tube assembly is provided comprising a cylindrical center tube and a light guide assembly carried internal of and adjacent to the inner wall of the center tube and selectively positionable relative thereto. Disposed at the proximal and distal ends of the center tube are respective end cap assemblies each carrying a respective lens fixedly mounted therein transverse to the center line of the center tube. Each end cap further includes an outer end spacer portion which spaces the lens surfaces inward along the center line of the tube away from the outermost ridges formed by the spacers. In operation the center tube is aligned vertically over the meter face which is then viewed through the center tube upon activation of the light assembly. The spacers prevent damaging contact of the lens at either end of the center tube with the meter face when the apparatus is employed. In a further embodiment, a cleaner assembly is provided for cleaning the meter face retainedly and releasably stored internal of the center tube.

The end cap assemblies are of a substantially identical construction, particularly with respect to their internal diameters, which are slightly smaller relative to the outer diameter of the center tube, so as to effect a pressfit water-tight seal with the center tube and to permit replacing one assembly with the other. Each end cap has internal thereof a ridge for carrying its respective lens which has a mating beveled edge for sealing engagement with the ridge when a silicone sealant is disposed therebetween. Preferably, at least one of the lenses is clear and one of a non-glare variety.

The light guide assembly is comprised of a second cylindrical tube of a smaller outside diameter than the internal diameter of the center tube and extends generally parallel to and internal of the center tube substantially along its length. At the proximal end of the light guide assembly, a light source such as a pen light is provided. The light guide assembly is pivotally mounted to the center tube so as to permit positioning of the light beam exiting the light guide assembly at the distal end. The distal end of the light guide assembly is further slanted so as to cause light to reflect off the inner wall of the center tube and onto the meter face, thus providing indirect lighting and reducing meter face glare.

Accordingly, it is a feature of the present invention to provide an improved apparatus for facilitating the reading of meters, particularly those of the water-meter variety.

Yet another feature of the present invention is to provide apparatus for facilitating meter reading under adverse conditions of varying lighting, glare, submerged meters, and conditions wherein the meter face is otherwise obscured by mud or the like.

Still another feature of the present invention is to provide a meter reading apparatus having an artificial light source, and particularly one which is of the adjustable type.

Yet a further feature of the present invention is to provide an improved combination meter reader viewing apparatus and meter face cleaner assembly.

Still an additional feature of the present invention is to provide a meter reading apparatus having reversibly interchangable lenses therefor.

BRIEF DESCRIPTION OF THE DRAWINGS

These and other objects and advantages of the present invention are hereinafter set forth and explained in greater detail with reference to the drawings, wherein:

FIGS. 1 and 2 are exploded isometric views, partly in cut-away, of one embodiment of the apparatus of the present invention.

DETAILED DESCRIPTION OF THE PREFERRED EMBODIMENT

Referring to FIGS. 1 and 2, there will be seen depicted therein generally a meter reading apparatus 10 of the present invention, comprised generally of a center tube assembly 12, a distal and proximal end cap assembly 14 and 16, respectively, carried by either end of the center tube assembly 12, and a meter face cleaner assembly 18 which, when stored, is disposed within the center tube assembly 12.

Referring first in more particularity to the center tube assembly 12, it will be seen to be comprised generally of a hollow cylindrical center tube 20 and a light guide assembly 22 disposed therein. The light guide assembly 22, in turn, may preferably be comprised of a light collimator tube 23 which is movably carried by the center tube 20 internally thereof by means of an appropriate fastener tie 34 which is routed through apertures 30 in the wall of the collimator tube 23 and apertures 32 disposed through the wall of the center tube 20.

The tie 34 may be "cinched" up to an appropriate looseness so as to permit movement of the tube 23 transverse to the center-line of tube 20 about tie 34 to adjust light direction while, at the same time, being tight enough to retain the relative re-oriented positions of the tubes 20 and 23.

It will be noted that at the proximal end of the light guide assembly 22, an end cap 26 may be provided which effects a press fit about the collimator tube 23. Still further, it will be noted from FIG. 1 that an aperture offset from the center of the end cap 26 in the end thereof permits passage therethrough of an appropriate battery powered light source 28 having a clip 70 at one side thereof. As depicted in FIG. 1, by disposing the light source 28 through the aperture of the end cap 26 and affixing the clip 70 to the side of the end cap 26 and the collimator tube 23, the light source 28 may thereby be retainedly disposed within the collimator tube 23.

Referring more particularly to the light guide assembly 22, it will further be noted that by turning the light source 28 on by means of the switch 72, light from the light source 28 will travel downwards of the collimator tube 23 and out the lower end thereof. Moreover, it will be noted that the lower end of the collimator tube 23 is preferably provided with an angular end 24 so as to permit the diffusion of light outward of the end thereof against the inner wall of the center tube 20. Due to the reflectivity of the inner surface of the center tube 20 (caused by appropriate selection of the material such as polyvinyl chloride and an appropriate bright color such as white), the light is thus dispersed outward of the lower or distal end of the center tube 20 and against the inner surface of tube 20 so as to provide indirect, non-glaring illumination of the meter face disposed beneath the meter reading apparatus 10 when it is being employed. In passing, it will also be noted that it may be found convenient to provide a suitable flexible handle 71 on the outer periphery of the center tube 20 for purposes of providing an easy means for carrying the meter reader apparatus 10.

Still referring to FIG. 1, and more particularly to the distal and proximal end cap assemblies 14 and 16, respectively, in a particularly suitable embodiment, the assemblies will be of approximately identical construction. The reason for doing so is that if the lens of the distal end cap assembly 14 is scratched, the entire assembly 14 may be replaced by the assembly 16 if necessary in an emergency situation. Yet another reason for providing interchangeability between the assemblies 14 and 16 is that it may be desirable to provide a clear lens for one of the assemblies and a smoked or amber lens, for example, for the other assembly, whereby, during varying lighting conditions, the appropriate assembly 14 or 16 may be located at the desired end so as to reduce glare and enhance the visibility of the meter face to be read.

Referring now more specifically to the construction of the assemblies 14 and 16, with reference to distal end cap assembly 14, it will be noted that it is basically comprised of a cylindrical lens cap 36 having an internal diameter slightly smaller than the outer diameter of the center tube 20 so as to permit a snug press fit of the lens cap 36 over the distal end of the center tube 20. On the inner surface of lens cap 36 a lens support lip 40 which may preferably be of a circular ridge formation is provided. The purpose of the lip 40 is to support an appropriate lens 38 which may be rigidly affixed to the lip 40 by means of a suitable silicone rubber sealant disposed between the lens 38 and the lip 40. In this regard, it will be noted that the lens 38 is further provided with a beveled edge 38a so as to enhance this watertight sealing effect provided by the silicone seal 44. It will also be noted from FIG. 1 that this silicone seal 44 is also provided at the upper edge of the lens cap 36 upon its installation about the center tube 20 so as to provide an entirely watertight seal between the end cap assembly 14 and the center tube 20 upon installation of the assembly 14 about the center tube 20.

One other feature of significance should be noted with respect to end cap assembly 14. The lip 40 is recessed inward of the outer end of the lens cap 36 so as to form a spacer 42, the purpose of which is to offset the surface of the lens 38 from the outer end of the lens cap 36, and thus a spacer 42 portion of the lens cap 36 provides this function.

Referring now to the proximal end cap assembly 16, it will be seen to be substantially identical in construction to that of the distal end cap assembly 14 hereinbefore described. Thus, in like manner to the distal end cap assembly 14, an appropriate lens support lip 48 is provided internal of the lens cap 46 for carrying the upper lens 50. Moreover, this lens 50 is in like manner to the previously described lens provided with a beveled edge 50a whereby an appropriate silicone rubber seal 54 may effect sealing between the lens 50 and the lip 48 which carries and supports the lens 50. Still further, in like manner to the distal assembly 14, the location of the lip 48 internal of the outer proximal end of the lens cap 46 thus effects a spacing of the face of the lens 50 from the end of the lens cap 46, e.g., a recessing of this lens face for protection.

The meter face cleaner assembly 18 will now be described in more detail. Referring to FIG. 2, a bristle support member 60 of a generally ring-like configuration may be provided. Pendantly disposed from the upper surface of the bristle support member 16 there may be provided a plurality of bristles 64 which may be affixed to the bristle support 60 by any convenient means such as "shooting" bristles in the support 60 by providing holes therein in a manner well known in the art, or by some other appropriate means such as epoxy or the like.

A cleaner handle 66 may further be provided which is rigidly affixed to the radially outward surface of the bristle support 60 by means of any convenient fasterners 68. It will be readily apparent from the positioning of the meter face cleaner assembly 18 thus described relative to the center tube assembly 18 as depicted in FIG. 1 that is is fully contemplated by the present invention that the meter face cleaner assembly 18 will be stored internally of the center tube assembly 20 when not in use. Accordingly, the outer diameter of the bristle support 60 may be selected so as to be slightly larger than the internal diameter of the center tube 20. Moreover, an aperture 62 may be provided in the bristle support 60. Thus, the aperture 62 may provide clearance for the light guide assembly 22 when the cleaner assembly 18 is disposed within the center tube 20. Moreover, due to the aforementioned relative dimensions of the bristle support 60 outer diameter and the center tube 20 inner diameter, the opposing portions of the bristle support 60 may be slightly compressed radially inward prior to disposing the bristle support 60 inwards of the center tube 20. In that the material comprising the bristle support 60 may be preferably selected of a resilient material such as polyvinyl chloride, it will thus be appreciated that the bristle support 60 will, in attempting to return to its initial shape, press radially outward against the inner surface of the center tube 20, thus retaining the cleaner assembly 20 within the center tube assembly 18 when not in use.

Having thus described the general structure of a preferred embodiment of the present invention, hereinafter follows a particular dimensional and materials-construction description of a preferred embodiment of the present invention:

PREFERRED EMBODIMENT OF THE INVENTION

The subject invention admits to several embodiments of varying dimension and material compositions, depending upon the particular application, which can be easily selected by one of ordinary skill in the art. However, it has been found that the following details with respect to the components set forth in FIG. 1 and their corresponding reference numbers have been found to be particularly suitable in most applications:

| FIG. 1 REF. NO. | COMPONENT | MATERIAL | DIMENSIONS |
| --- | --- | --- | --- |
| 36 & 46 | Lens Cap | PVC Bushing Schedule 40 PVC Pipe | ⅛" × 1¾" × 3" i.d. |
| 38 | Lens | Plexiglass, Amber | ⅛" × 3" i.d. |
| 50 | Lens | Plexiglass, Clear | ⅛" × 3" i.d. |
| 20 | Center Tube | PVC Diameter Pipe 1500 psi Crush ASTM D-2729-78 | 3/32" × 3¼" o.d. × desired length, nominally 30–60" |
| 60 | Bristle Support Sleeve | Schedule 40 PVC Pipe ASTM D-2665 | ¼" × ¾" × 3½" o.d. with 20 ⅛" holes evenly spaced |
| 62 | Aperture | | 1¼" |
| 64 | Bristles | | 20 each, 0.016" × 1¾" embedded 3/16" |
| 66 | Cleaner Handle | PVC | ¼" square × desired length, nominally 30–60" slightly less than center tube 20 length |
| 23 | Collimator Tube | PVC | 1/16" × 1¼" o.d. × desired length, nominally 30–60" slightly less than center tube 20 length |

Having thus described the structure of the present invention, a typical operation thereof will now be described. Upon transporting the meter reading apparatus 10 of the present invention to the situs of the desired meter to be read, if the face of the aforementioned meter is in need of cleaning, the proximal end cap assembly 16 is removed from the center tube assembly and the meter face cleaner assembly 18 extracted from the center tube assembly 18. The cleaner assembly 18 is thereafter reversed, the cleaner handle 66 grasped, and the face of the meter cleaned by means of the bristle 64. The cleaner assembly 18 is thereafter replaced in the center tube assembly 18 as depicted in FIG. 1, and the switch 72 turned to the "on" position so as to actuate the light source 28. The proximal end cap assembly 16 is thereafter replaced on the proximal end of the center tube 20.

At this point, the meter reading is then ready to be observed. The operator will thence position the meter reading apparatus 10 vertically with the face of the meter to be read in abutting engagement with the lower rim of the spacer 42 so as to align in parallel the meter face with the lenses 38 and 50. It will be appreciated that due to the provision of the dimension "x" provided by the spacer 42, the face of the lens 38 is separated from that of the meter face so as to prevent scratching or other distortion of the lens 38.

The operator then, looking in a generally downward direction, will view through the top of the proximal end cap assembly 16 downward therethrough and through the center tube assembly 20 and the distal end cap assembly 14 and observe the meter reading from the face of the meter, which is generally pointing in an upward direction.

It is a particular feature of the present invention and accordingly specifically contemplated, that due to the hereinbefore described varying lighting conditions experienced with respect to various meters to be read, provision will be made for adjusting the incident light upon the meter face. Thus, the fastener means (such as tie 34 and apertures 30 and 32) provided for attaching the light guide assembly 22 to the wall of the center tube 20 will permit directional movement of the collimated light exiting the distal end 24 of the collimator tube 23. While it has thus been found that the herein described tie means 34 and apertures 30 and 32 may satisfactorily provide this feature, the invention admits of other pivoting means for effecting this rotating mechanical interconnection between the guide assembly 22 and the center tube 20 such as, for example, a rivet or bolt and nut assembly extending through the walls of the collimator tube 23 and the center tube 20. It will be noted from FIG. 1 that the location of the pivot point is preferably generally toward the proximal end of the center tube 20 and the collimator tube 23. The purpose for this is so that a slight horizontal or transverse movement of the proximal end of the collimator tube 23 adjacent the end cap 26 relative to center tube assembly 12 will provide a larger movement of the light shaft exiting the tube end 24. This will facilitate adjustment of the incident light upon the meter face at the distal end of the center tube 20 by slight adjustments in the position of the end cap and its relative rotation about the apertures 30, 32, and the tie 34.

As hereinbefore described regarding varying lighting conditions, it is furthermore contemplated that in some instances it may be desirable to read meters without the artificial light source 28, and, accordingly, in such situations the switch 72 will be left in the "off" position. Moreover, it will be recalled that it may be desirable to provide for one lens being clear and another being of a more smoky or amber and thus non-reflective tint. Accordingly, lens 38 may be clear and lens 50 of the tinted variety or visa-versa. Thus, if a clear reading may not be obtained with the meter reader apparatus 10 oriented as depicted in FIG. 1, the apparatus 10 may be reversed, whereupon the amber lens is adjacent the meter face and the clear lens 38 is thus the upwardmost lens.

In instances in which a light assembly 22 and meter face cleaner assembly 18 are not desired, the distal and proximal end cap assemblies 14 and 16 may be sealedly attached to the center tube assembly 12 by means of the silicone seals 44 and 54. In other instances wherein it is desirable to treat the lens 50 as a replacement lens and when it is desirable to include the light assembly 22 or the cleaner assembly 18, it is further desirable to omit the sealedly attaching seals 54 and 44 interconnecting the respective proximal and distal end cap assemblies 16 and 14 and center tube assembly 12, so as to effect ready removal of the assembly 16 or 14 from the center tube assembly 12.

Due to the frequency of encountering submerged water meters, in most cases it is desirable to at least have the silicone seal 44 in place between the distal end cap assembly 14 and the center tube assembly 12. However, when it is desired to, in the field, replace the lens 38, the seal 44 may be broken, the distal end cap assembly 14 removed, and the proximal end cap assembly 16 removed from the upper end of the center tube assembly and used to replace the distal assembly 14 which was just removed, thereby substituting lens 50 for lens 40. Moreover, it may then be desirable to re-effect the seal 44 with a quick-drying sealant prior to continued usage of the meter reading apparatus 10.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

I claim:

1. Apparatus for facilitating readings from a meter face by a human observer, comprising:
   (a) center tube means, having a proximal end and a distal end, for providing a shaded viewing path therethrough between said observer and said meter face;
   (b) distal end cap assembly means disposed about said distal end of said center tube means for sealing off said center tube means at said distal end and permitting said viewing of said meter face therethrough, said distal end cap assembly means including
       a distal lens cap; and
       a distal lens disposed within said distal lens cap, said distal lens cap including
           a distal spacer means for abutting engagement with said meter face and for providing spacing between said meter face and said distal lens upon said abutting engagement;
   (c) a light assembly means internal of, and carried by, said center tube means for illuminating said meter face; and
   (d) pivotal mounting means interconnecting said center tube means and said light assembly means for retainedly adjusting the position of said light assembly means relative to said center tube means.

2. Apparatus for facilitating readings from a meter face by a human observer, comprising:
   (a) center tube means, having a proximal end and a distal end, for providing a shaded viewing path therethrough between said observer and said meter face; and
   (b) distal end cap assembly means disposed about said distal end of said center tube means for seaing off said center tube means at said distal end and permitting said viewing of said meter face therethrough, said distal end cap assembly means including
       a distal lens cap; and
       a distal lens disposed within said distal lens cap, said distal lens cap including
           a distal spacer means for abutting engagement with said meter face and for providing spacing between said meter face and said distal lens upon said abutting engagement;
   (c) a proximal end cap assembly, disposed about said proximal end of said center tube means for sealing off said center tube means at said proximal end and permitting said viewing of said meter face therethrough, including
       a proximal lens cap; and
       a proximal lens disposed within said proximal lens cap;
   wherein said distal end cap assembly and proximal end cap assembly are reversibly disposable, respectively, about said proximal end and said distal end of said center tube means; and wherein said proximal lens includes
       a proximal spacer means for abutting engagement with said meter face and for providing spacing between said meter face and said proximal lens when said distal end cap assembly and proximal end cap assembly are reversibly disposed about said center tube means;

(d) a light assembly means internal of and carried by said center tube means for illuminating said meter face; and (e) pivotal mounting means interconnecting said center tube means and said light assembly means for retainedly adjusting the position of said light assembly means relative to said center tube means.

3. An apparatus as defined in claim 2, wherein said light assembly means includes:

an artificial source of light; and a collimator tube means carrying said light source to a proximal end thereof for collimating said light, said tube having a distal end guide for directing at least a portion of said light onto said meter face obliquely and in an amount sufficient to substantially reduce glare on said face.

4. Apparatus for facilitating readings from a meter face by a human observer, comprising:

(a) center tube means, having a proximal end and a distal end, for providing a shaded viewing path therethrough between said observer and said meter face; and (b) distal end cap assembly means disposed about said distal end of said center tube means for sealing off said center tube means at said distal end and permitting said viewing of said meter face therethrough, said distal end cap assembly including a distal lens cap; and a distal lens disposed within said distal lens cap, said distal lens cap including a distal spacer means for abutting engagement with said meter face and for providing spacing between said meter face and said distal lens upon said abuttng engagement;

(c) a proximal end cap assembly, disposed about said proximal end of said center tube means for sealing off said center tube means at said proximal end and permitting said viewing of said meter face therethrough, including a proximal lens cap; and a proximal lens disposed within said proximal lens cap;

wherein said distal end cap assembly and said proximal end cap assembly are reversibly disposable, respectively, about said proximal end and said distal end of said center tube means, said proximal lens including a proximal spacer means for abutting engaement with said meter face and for providing spacing between said meter face and said proximal lens when said distal end cap assembly and said proximal end cap assembly are reversibly disposed about said center tube means;

wherein one of said distal lens and said proximal lens is tinted and the other of said distal lens and said proximal lens is clear;

(d) a light assembly means internal of and carried by said center tube means for illuminating said meter face; and (e) pivotal mounting means interconnecting said center tube means and said light assembly means for retainedly adjusting the position of said light assembly means relative to said center tube means.

5. The apparatus of claim 4, wherein said light assembly means includes:

an artificial source of light; and a collimator tube means carrying said light source at a proximal end thereof for collimating said light, said collimator tube having a distal end guide for directing at least a portion of said light onto said meter face obliquely and in an amount sufficient to substantially reduce glare on said face.

6. Apparatus for facilitating readings from a meter face by a human observer, comprising:

(a) center tube means, having a proximal end, a distal end, and an inner wall, for providing a shaded viewing path therethrough from said observer to said meter face;

(b) a light assembly means carried internally and on said inner wall of said center tube means for illuminating said meter face, wherein said light assembly means includes a cylindrical collimating tube having proximal end and a distal end;

a pivoting means interconnected between said cylindrical collimating tube and said center tube means for altering the direction of said light out of said distal end of said cylindrical collimating tube and onto said meter face in response to movement of said proximal end of said cylindrical collimating tube about said pivoting means, and wherein said pivoting means is located closer to said proximal end of said cylindrical collimating tube than to said distal end of said cylindrical collimating tube.

7. The apparatus of claim 6, wherein said cylindrical collimating tube includes a beveled end portion of said distal end.

8. In combination, apparatus for facilitating readings from and for cleaning the face of a meter by a human observer, comprising:

(a) a cylindrical center tube for providing a shaded viewing path between said observer and said meter face having a distal end, a proximal end, and an internal diameter; and (b) a cleaner assembly, releasably disposable within said cylindrical center tube, including a resilient collar-like bristle support forming an upper face lying in a first plane and an aperture at the throat thereof, said support further having an outside diameter across said support in a direction parallel to said first plane larger than said internal diameter of said cylindrical center tube when released from said cylindrical center tube and equal to said internal diameter when disposed within said cylndrical center tube and compressed in an amount sufficient to reduce said aperture;

a plurality of bristles extending outward of said upper face and fixedly attached to said support; and a cleaner handle interconnected to said support and extending in a direction generally perpendicular to said plane.

9. The apparatus of claim 8, further including:

distal end and proximal end cap assembly means disposed respectively about said distal end and said proximal end of said center tube for sealing off said center tube at said distal end and said proximal end and permitting said viewing of said meter face therethrough; and light assembly means internal of and carried by said center tube for illuminating said meter face, said light assembly means including a collimator tube carried along the internal wall of said cylindrical center tube and extending generally in the direction of said cylindrical center tube, said collimator tube being disposed within said aperture of said bristle support when said support is disposed within and carried by said center tube.

* * * * *